United States Patent [19]

Jabloner

[11] 4,404,314
[45] Sep. 13, 1983

[54] PREPARATION OF STABLE AQUEOUS DISPERSIONS OF POLYOLEFIN FIBERS

[75] Inventor: Harold Jabloner, Wilmington, Del.

[73] Assignee: Hercules Incorporated, Wilmington, Del.

[21] Appl. No.: 338,931

[22] Filed: Jan. 12, 1982

[51] Int. Cl.$^3$ .............................................. C08L 33/26
[52] U.S. Cl. .................................... 524/519; 524/521; 525/213
[58] Field of Search ................. 524/519, 521; 525/213

[56] References Cited
U.S. PATENT DOCUMENTS 4,154,647  5/1979  Rave .............................. 162/157 R

*Primary Examiner*—Joseph L. Schofer
*Assistant Examiner*—J. M. Reddick
*Attorney, Agent, or Firm*—Jeffrey F. Craft

[57] ABSTRACT

Stable aqueous dispersions of polyolefin fibers are formed by contacting the fibers with an aqueous solution of a cationic copolymer of an acrylamide and an acrylate or methacrylate ester, the pH of the aqueous solution having been adjusted to be in the range of from about 9.5 to about 12 either prior to, during or after contacting the fibers with said solution. An exemplary copolymer is that formed by the copolymerization of acrylamide and $\beta$-methacryloyloxyethyltrimethylammonium methyl sulfate.

8 Claims, No Drawings

PREPARATION OF STABLE AQUEOUS DISPERSIONS OF POLYOLEFIN FIBERS

This invention relates to the treatment of spurted polyolefin fibers in an aqueous system to render them readily dispersible in water. The aqueous polyolefin pulp resulting from this treatment is stable over long periods of time and the treated fibers, after being isolated from the aqueous phase of the polyolefin pulp and additionally dried, if so desired, are readily redispersible in water without further treatment. More particularly, the invention relates to contacting an aqueous suspension of spurted polyolefin fibers with certain cationic, water-soluble acrylic polymers, resulting in the formation of modified fibers.

In many of the important applications of spurted polyolefin fibers, it is necessary to utilize an aqueous dispersion of the fibers. However, since these fibers are hydrophobic and have a low specific gravity, they are not readily wet by water and have a tendency to float. Therefore, even though an aqueous dispersion can be formed by using only vigorous agitation, it is not stable. Consequently, the art has been confronted for some time with the problem of providing effective aqueous dispersions of these polyolefin fibers. Dispersions prepared using some of the well known wetting and dispersing agents have been satisfactory in a number of direct use applications, but these wetting and dispersing agents have had limited applicability in those cases wherein it has been desirable to have the treated fibers in wet lap or dry form and then redisperse them in an aqueous system. In such cases, an additional amount of the usual wetting or dispersing agent then has had to be used to effect the desired redispersion of the fibers because very little, if any, of the amount originally used has been retained on the fiber surfaces. Instead, it has remained substantially completely dissolved in the aqueous phase when the latter is separated from the fibers in the formation of a wet lap product.

Now, in accordance with this invention, it has been found that a stable aqueous dispersion of spurted polyolefin fibers is formed by a process which comprises intimately contacting the fibers with an aqueous solution containing from about 0.25 to about 2.0% by weight, based on the weight of the fibers, of a cationic, water-soluble acrylic polymer formed by the copolymerization of from about 60 to about 85% by weight of an acrylamide having the formula

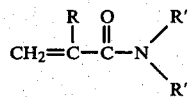

with from about 15 to about 40% by weight of an acrylate or methacrylate ester having the formula

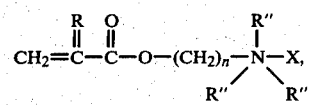

the amount of each monomer being based on the total monomers charged, R being hydrogen or methyl, R' being hydrogen, methyl or ethyl, R" being methyl or ethyl, at least one R" being methyl when X is the methyl sulfate anion, X alternatively being the chloride anion, and n is 1 to 4, the pH of said aqueous solution having been adjusted to be in the range of from about 9.5 to about 12 either prior to, during or after contact of said fibers with said solution, thereby forming modified fibers.

As an example of the process of this invention, a cationic acrylic polymer prepared by copolymerizing, for example, β-methacryloyloxyethyltrimethylammonium methyl sulfate (MTMMS) with acrylamide, the ratio of MTMMS to acrylamide being about 1:3 by weight, is dissolved in water to form a dilute aqueous solution containing the polymer. Such a solution will normally have a pH of about 7. Measured amounts of the solution are used to prepare solutions containing the desired amount of polymer relative to the amount of fiber to be treated. After adjusting the pH of any of these solutions to the desired level of alkalinity, the spurted polyolefin fibers are added to the solution and the resulting mixture is thoroughly agitated for a short period of time, thereby forming a stable dispersion of modified fibers in the aqueous medium. These modified fibers may be isolated, as by filtration, and stored as a wet lap, or dried. In either form, the fibers are readily redispersible.

Having generally outlined the embodiments of this invention, the following examples provide more specific details pertaining to the invention. All amounts are based on parts by weight unless otherwise indicated.

EXAMPLE 1

This example illustrates the preparation of a typical spurted polyolefin fiber product used in accordance with this invention. One hundred eighty parts of isotactic polypropylene having an intrinsic viscosity of 2.7 in decahydronaphthalene at 135° C. and 1020 parts of pentane were charged to a closed autoclave. The contents of the autoclave were stirred and heated to 160° C., at which point the vapor pressure in the autoclave was raised to 850 p.s.i. by the introduction of nitrogen. The resulting solution was spurted from the autoclave into the atmosphere through an orifice having a diameter of one millimeter and a length of one millimeter, resulting in evaporation of the pentane solvent and formation of the polypropylene fiber product. Typically, this product will be composed of very fine filaments, of a thickness of the order of a micron, connected to one another to form a three-dimensional network. The general shape of the fibers, which have a flocculent appearance, is oblong. Their length varies from about one-half millimeter to about five centimeters and their diameter varies from about one-hundredth of a millimeter to about five millimeters. The specific surface area of these products is greater than one square meter per gram and in some cases may be greater than ten square meters per gram.

EXAMPLE 2

This example shows the preparation of a representative acrylic polymer utilized in accordance with this invention. A solvent mixture composed of 48 parts of acetone and 108 parts of water was prepared and to it were added 15 parts of β-methacryloyloxyethyltrimethylammonium methyl sulfate and 29 parts of acrylamide (34% MTMMS and 66% acrylamide) and 0.011 part of potassium persulfate with stirring. The resulting solution was added to a polymerization vessel and blanketed with nitrogen. The vessel was then sealed and its contents were stirred at 50° C. for 18 hours. The polymerization reaction mixture, in the form of a slurry of polymer particles in the solvent mixture, was filtered and the polymer product was dried. It had a Brookfield viscosity of 900 centipoises, as determined on a one percent aqueous solution of the polymer at 25° C. using a standard Brookfield LVF viscometer at 60 r.p.m.

EXAMPLES 3–7

In these and subsequent examples the dispersibility index (DI) of the polyolefin fibers was determined by a procedure comparable to that described in U.S. Pat. No. 3,743,570 to Yang et al (Crown Zellerbach Corporation). In so doing, the acrylic polymer used as the dispersing agent in accordance with this invention is dissolved in water to form an essentially neutral one percent by weight solution of the polymer. A measured amount of this solution sufficient to provide the desired concentration of the polymer relative to the amount of fibers to be treated is added to an amount of water sufficient to form 150 ml. of aqueous solution. At this point, the pH of the solution is adjusted, normally directed to the desired level. However, in the present examples, different adjustments are shown for comparative reasons.

To the resulting solution is added three grams of the polyolefin fiber product and the aqueous pulp is beaten for two minutes in a Waring Blendor. The pulp is then transferred to a graduated cylinder and diluted to 800 ml. with distilled water to provide a 0.375% pulp slurry. The cylinder is inverted four times, after which the volume of clear water at the bottom of the cylinder is determined at 10, 20, 30, 40, 50, 60, 80 and 120 seconds. These volumes are added and the sum is divided by eight to provide the dispersibility index value. The procedure of inverting the cylinder and measuring the volume of clear water at the bottom of the cylinder is repeated three more times, and the average of the four tests is determined.

Following the above procedure, a one percent by weight aqueous solution of the acrylic polymer of Example 2 was prepared, and three milliliters (0.03 gram of polymer) of this solution was added to 147 ml. of water to form the 150 ml.-solution specified above. Several of these solutions were prepared and the initial pH adjustments shown in the following table were made, after which three grams of polypropylene fibers prepared according to the process of Example 1 was added. Thus, the amount of polymer (0.03 gram) based on the amount of fibers (3.0 grams) was 1.0%. The aqueous pulps were then beaten and, in two cases, subsequent pH adjustments were made prior to determination of the dispersibility index.

TABLE 1

| Example No. | pH Adjustment (Initial) | pH Adjustment (Additional) | Dispersibility Index |
|---|---|---|---|
| 3 | pH 6 (dilute H₂SO₄) | — | 349 |
| 4 | pH 10 (dilute NaOH) | — | 29 |
| 5 | pH 10 (dilute NaOH) | pH 6 (dilute H₂SO₄, after beating) | 22 |
| 6 | pH 6 (dilute H₂SO₄) | pH 10 (dilute NaOH, after beating) | 44 |
| 7 | pH 10 (dilute NaOH) then reduced to pH 5.5 (dilute H₂SO₄) | — | 32 |

The above data establish the necessity of imparting an appreciable alkalinity to the aqueous acrylic polymer solution at some time during the treatment of the polyolefin fibers with this solution. Moreover, the data of Examples 5 and 7, wherein treatment with acid followed treatment with alkali, show that, by comparison to the data of Example 3, the improvement in dispersibility index brought on by treatment with alkali is not reversible. An apparently related fact is that a decrease in viscosity of the polymer solution upon treatment with alkali is not reversed by subsequent treatment with acid.

EXAMPLES 8–13

Following the general procedure of Examples 3 and 4, a number of runs were made in which the amount of acrylic polymer based on the amount of polypropylene fibers was varied. The results obtained are given in Table 2.

TABLE 2

| Example No. | pH | Amount of 1% Polymer Solution (ml.) | Percent Polymer Based on Fibers | Dispersibility Index |
|---|---|---|---|---|
| 8 | 10 | 0.375 | 0.125 | 203 |
| 9 | 10 | 0.75 | 0.25 | 102 |
| 10 | 10 | 1.5 | 0.50 | 36 |
| 11 | 10 | 3.0 | 1.0 | 35 |
| 12 | 10 | 6.0 | 2.0 | 51 |
| 13 | 5–6 | 6.0 | 2.0 | 365 |

These data show that in order to obtain a dispersibility index of about 100 or less, it is desirable to use from about 0.25 to about 2% by weight of the polymer, based on the weight of the fibers. A dispersibility index of from about 30 to about 100 is considered to be good, less than 30 is very good and greater than 100 is relatively poor. Example 13 again shows, as did Example 3, the inoperability of a polymer solution which has only been adjusted to an acid pH. In a set of related experiments using 0.5, 1.0 and 2.0 percent amounts of the acrylic polymer based on the amount of fibers treated, it was determined by analysis that the fibers, after being isolated and dried, contained 0.042, 0.053 and 0.057 percent nitrogen respectively. Based on analysis of the polymer used, which contained 15.3% nitrogen, the corresponding amounts of polymer adsorbed on the fibers were calculated to be 0.27, 0.35 and 0.37 percent respectively.

EXAMPLE 14

The dispersion from Example 10 was filtered through cheesecloth and the recovered fibers were allowed to air dry for four days. The fibers were then added to 150 ml. of water having a pH of 10. The fibers were readily wetted by the water and the aqueous pulp was beaten for ten seconds in a Waring Blendor. Following the procedure of Example 10, the dispersibility index was determined and found to be 53, which is indicative of a good dispersion.

EXAMPLE 15

The procedure described under Examples 3-7 for determining the dispersibility index was followed except that the acrylic polymer of those examples was replaced by poly(vinyl alcohol) and there was no pH adjustment of the aqueous solution thereof, which solution was essentially neutral. The measured amount of this solution which was added to water to form the 150 ml. solution was six milliliters, corresponding to two percent of the PVA based on the three grams of fibers. The dispersibility index was found to be 174. Comparing this to the DI of 51 obtained in Example 12, it is apparent that the acrylic polymer used in accordance with this invention provides markedly improved results.

EXAMPLE 16

Polyethylene fibers were prepared following generally the procedure of Example 1. These fibers were then evaluated in accordance with Examples 9 to 12. The following results were obtained: 0.25% polymer based on the fibers, DI 92; 0.5% polymer, DI 29; 1.0% polymer, DI 17 and 2.0% polymer, DI 18.

EXAMPLE 17

Example 16 was repeated using an acrylic polymer prepared by following the procedure of Example 2 except for using seven and one-half parts of $\beta$-methacryloyloxyethyltrimethylammonium methyl sulfate and 36.5 parts of acrylamide (17% MTMMS, 83% acrylamide). The copolymer product had a Brookfield viscosity of 700 centipoises, as determined on a one percent aqueous solution of the polymer at 25° C. using a standard Brookfield LVF viscometer at 60 r.p.m. The results obtained were as follows: 0.25% polymer based on the fibers, DI 162; 0.5% polymer, DI 48; 1.0% polymer, DI 62 and 2.0% polymer, DI 26.

EXAMPLE 18

The procedure of Example 2 was followed except to use 7.5 parts of $\beta$-methacryloyloxyethyltrimethylammonium chloride in place of the 15 parts of the corresponding methyl sulfate salt and to increase the amount of acrylamide to 36.5 parts (17% MTMCl and 83% acrylamide). The copolymer product had a reduced specific viscosity of 14.2 deciliters per gram and a Brookfield viscosity, as in Example 2, of 860 centipoises. Following the procedures of Examples 3 and 4, it was found that the dispersibility index was 191 at a pH of 6 and 35 at a pH of 10.

EXAMPLE 19

Air dried fibers prepared in accordance with Example 14 and in the amount of 2.65 parts were mixed with 1135 parts of a stucco mix consisting essentially of sand and cement in a Henschel mill for one minute at 2200 r.p.m. The resulting mixture was converted to a wet cement having a slump value of 50, as determined by ASTM C-143, by mixing it with 280 parts of water in a Hobart mixer for eight minutes. This wet cement could be readily pumped and was essentially equivalent in this regard to a wet cement containing a comparable volume of asbestos fibers. A wet cement containing no fibers but having a slump value of 50 could not be pumped using the same equipment and conditions. Also, when unmodified polypropylene fibers were substituted for the modified fibers prepared in accordance with Example 14, it was not possible to prepare a homogeneous wet cement due to incomplete wetting of the fibers, resulting in flotation and clumping of the fibers in the cement.

EXAMPLE 20

Eight hundred fifty-six parts of a water-wet mat (53% solids) of polypropylene fibers prepared according to Example 1 and 309 parts of a one percent by weight aqueous solution of the acrylic polymer of Example 2 were added to 30000 parts of water in a Sprout Waldron disc refiner. The initial pH of the pulp so formed was 8.7 and this was adjusted to 10 by the addition of an aqueous sodium hydroxide solution. The blades of the refiner were set at a clearance of 0.03 mil, and the pulp slurry was circulated in the refiner for ten minutes. The slurry was then filtered and the isolated fibers were dried.

The individual components of a joint cement composition were charged to a Hobart mixer. These components and the amounts thereof relative to the total composition were as follows: water, 33.7%; polyvinyl alcohol, 4.0%; calcium carbonate, 56.0%; mica, 3.3%; hydrated aluminum silicate, 2.4%; hydroxypropyl methyl cellulose, 0.3%; and miscellaneous additives (preservative, defoamer, thickener), 0.3%. An identical composition except for the addition of 1.0% by weight, based on said composition, of the dried fibers described above was prepared in a Hobart mixer. Each of the compositions was mixed for 20 minutes. Samples of each composition were then molded on a sheet of dry wall board, each molded sample being in the form of a rectangular object six inches long, two inches wide and one-eighth of an inch thick. After curing for 24 hours at room temperature, the molded samples containing no modified polypropylene fibers exhibited severe cracking, whereas those samples containing the modified fibers had completely smooth surfaces.

The spurted polyolefin fibers which are used in the process of this invention are themselves prepared by a process wherein the polyolefin is dispersed in a liquid which is not a solvent for the polyolefin at its normal boiling point, heating the resulting dispersion at superatmospheric pressure to dissolve the polymer and then discharging the resulting solution into a zone of reduced temperature and pressure to form the fibrous product. The liquid in which the polyolefin is dispersed may be a halogenated hydrocarbon such as methylene chloride, chloroform or carbon tetrachloride, an aromatic hydrocarbon such as benzene, toluene or xylene, an aliphatic hydrocarbon such as pentane or hexane, or an alicyclic hydrocarbon such as cyclohexane. Mixtures of these solvents may be used, and water may be present when it is desired to form an emulsion of the polyolefin. Moreover, the pressure generated by the solvent vapors may, and normally will, be augmented by a pressurized inert gas such as nitrogen or carbon dioxide.

The temperature to which the dispersion of the polyolefin in the solvent is heated to form a solution of the polyolefin will depend upon the particular solvent used but should be sufficiently high to effect dissolution of the polyolefin. Temperatures in the range of about 100° to about 225° C. ordinarily will be used, and the concentration of the polyolefin in the resulting solution normally will be from about five to about forty percent by weight. The pressure on the polyolefin solution may be from about 600 to about 1500 p.s.i., preferably from about 900 to about 1200 p.s.i. The orifice through which the solution is discharged will have a diameter of from about one-half to about fifteen millimeters and a length to diameter ratio of from about one-fifth to about ten.

The polyolefin fibers shown in the examples are spurted polypropylene and polyethylene fibers. However, the process of this invention is also applicable to spurted fibers prepared from copolymers of ethylene and propylene, copolymers of propylene and other 1-olefins such as 1-butene, 4-methylpentene-1 and 1-hexane, and mixtures of any of the aforementioned polymers.

The acrylic polymer used in accordance with this invention is a copolymer of an acrylamide and an acrylate or methacrylate alkyl ester containing a quaternary ammonium group, all as defined by the structural formulas given above. Representative of the acrylamide compounds are acrylamide, methacrylamide, N-ethylacrylamide and N,N-dimethylacrylamide. Exemplary of the ester compounds are $\beta$-methacryloyloxyethyltrimethylammonium methyl sulfate, acryloyloxybutyldiethylmethylammonium methyl sulfate, $\beta$-methacryloyloxyethyltrimethylammonium chloride, acryloyloxyethyldiethylmethylammonium chloride and $\beta$-methacryloyloxypropylethyldimethylammonium methyl sulfate.

Based on the total amount of monomers used in the copolymerization reaction, the amount of acrylate or methacrylate ester may be varied from about 15 to about 40% by weight, preferably from about 20 to about 35%. The corresponding amount of the acrylamide will range from about 60 to about 85% by weight, preferably from about 65 to about 80%. Copolymers containing appreciably less than about 15% or appreciably more than about 40% by weight of the acrylate or methacrylate ester are not as effective as dispersing agents for the polyolefin fibers as are the copolymers specified herein. Processes for carrying out the copolymerizations here involved are well known in the art. For example, reference may be made to the process of U.S. Pat. No. 3,509,113 to Monagle et al (Hercules Incorporated).

The fiber modifying process of this invention results in deposition of the acrylic polymer on the spurted fibers, and the original fibers are thereby converted into modified fibers which are capable of being readily dispersed in an aqueous medium. The fiber modifying process is carried out by suspending the polyolefin fibers in a dilute aqueous solution of the acrylic polymer, the pH is adjusted in accordance with the invention, and the suspension is thoroughly agitated, resulting in the deposition of the polymer on the surface of the fibers. Use of an amount of polymer ranging from about 0.25 to about 2.0% of the polymer by weight, based on the weight of the fibers, provides modified fibers having an acceptable dispersibility index not only originally, but also upon being redispersed. Within this range, the amount of acrylic polymer actually adsorbed on the surfaces of the polyolefin fibers will vary, depending on the particular batch of fibers and the amount of polymer used, but will generally be from about 0.15 to about 0.5% by weight based on the fibers, and more generally from about 0.25 to about 0.4%.

A DI of about 15 to about 30 indicates essentially complete dispersibility, and a DI of from about 30 to about 100 is indicative of good dispersibility. Values appreciably above 100 indicate poor dispersibility. To provide acceptable dispersibility (DI of about 100 or less), the minimum amount of polymer used based on the fibers should be about 0.25%. Amounts greater than about 2.0% do not provide appreciable further improvements in dispersibility and are thus unnecessary. A preferred range for the amount of polymer used by weight based on the fibers is from about 0.5 to about 1.5%, with about 0.5 to about 1.0% being especially preferred. On the other hand, the molecular weight of the polymer does not have a significant effect on the dispersibility index. As determined using 0.025% solutions of the polymers in 0.1 M potassium chloride at 25° C., the reduced specific viscosity could vary from 1.3 to 12.0 deciliters per gram, yet all of the polymers were excellent dispersants for polyolefin fibers.

The process of this invention provides improved dispersions of polyolefin fibers. The improvement is the consequence of having prepared during the process a modified fiber product in which the surfaces of the fibers have adsorbed thereon a particular type of acrylic polymer which has been subjected to appreciable alkalinity prior to, during or after contacting a solution of the polymer with the polyolefin fibers. When so subjected to appreciable alkalinity, the acrylic polymer used in accordance with this invention has the capability of adhering tightly to the surfaces of the spurted polyolefin fibers. The dispersions produced by the process are stable for weeks at a time regardless of the pH at which they are stored. A further advantage of these dispersions is that considerably less of the acrylic polymer based on the amount of fibers treated is needed in preparation of the dispersions in comparison to many other dispersants. For example, poly(vinyl alcohol), a widely used dispersant for polyolefin fibers, is considerably less effective at a concentration of two percent based on the fibers than 0.25% of the acrylic polymer used in accordance with this invention. The dispersions produced by the process of this invention are useful in all cases where a stable dispersion of polyolefin fibers is desired. For example, the dispersions may be used in conjunction with cellulosic pulps to provide a pulp which can be made into high quality paper products. Also, the dispersions may be used as the source of modified fibers which, in turn are useful because of their redispersibility, as shown in Examples 19 and 20.

What I claim and desire to protect by Letters Patent is:

1. A process of forming a stable aqueous dispersion of spurted polyolefin fibers comprising intimately contacting said fibers with an aqueous solution containing from about 0.25 to about 2.0% by weight, based on the weight of said fibers, of a cationic, water-soluble acrylic polymer formed by the copolymerization of from about 60 to about 85% by weight of an acrylamide having the formula

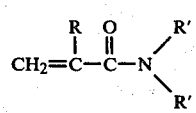

with from about 15 to about 40% by weight of an acrylate or methacrylate ester having the formula

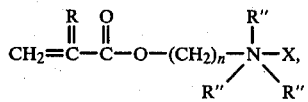

the amount of each monomer being based on the total monomers charged, R being hydrogen or methyl, R' being hydrogen, methyl or ethyl, R" being methyl or ethyl, at least one R" being methyl when X is the methyl sulfate anion, X alternatively being the chloride anion, and n is 1 to 4, the pH of said aqueous solution containing said acrylic polymer having been adjusted to be in the range of from about 9.5 to about 12 either prior to, during or after contacting said fibers with said solution, thereby forming modified fibers.

2. The process of claim 1 wherein the polyolefin fibers are polypropylene fibers.

3. The process of claim 1 wherein the polyolefin fibers are polyethylene fibers.

4. The process of claim 1 wherein the aqueous solution containing the acrylic polymer contains from about 0.5 to about 1.5% by weight of said polymer, based on the weight of said fibers.

5. The process of claim 1 wherein the acrylamide is acrylamide and the methacrylate ester is β-methacryloyloxyethyltrimethylammonium methyl sulfate.

6. The process of claim 5 wherein the amount of acrylamide is about 65% and the amount of β-methacryloyloxyethyltrimethylammonium methyl sulfate is about 35% of the total monomers charged.

7. The process of claim 1 wherein the modified fibers produced in the process are isolated from the aqueous dispersion containing them.

8. The modified fibers produced by the process of claim 7.

* * * * *